United States Patent [19]

Cass et al.

[11] 4,316,239

[45] Feb. 16, 1982

[54] TRUNK LAMP ASSEMBLY

[75] Inventors: Louis G. Cass, Detroit; Nicholas Poleschuk, Farmington; Samuel Purdy, Ortonville, all of Mich.

[73] Assignee: Beta Manufacturing Corp., Warren, Mich.

[21] Appl. No.: 57,575

[22] Filed: Jul. 16, 1979

[51] Int. Cl.³ .................. B60Q 3/06; H01H 35/02; H01H 29/20
[52] U.S. Cl. .................. 362/155; 362/61; 362/80; 362/374; 362/375; 200/61.47; 200/184; 200/190; 200/220
[58] Field of Search ............ 362/155, 80, 61, 374, 362/375; 200/184, 190, 220, 61.47

[56] References Cited

U.S. PATENT DOCUMENTS

| 2,228,456 | 1/1941 | Hobbs | 362/155 |
|---|---|---|---|
| 3,193,673 | 7/1965 | Herring | 362/80 |
| 3,553,448 | 1/1971 | Davis et al. | 362/80 |
| 3,576,409 | 4/1971 | Fiddler | 362/80 |
| 3,895,197 | 7/1975 | Mizrahi | 362/80 |
| 3,895,197 | 7/1975 | Mizrahi | 200/61.47 |
| 4,122,371 | 10/1978 | Talmadge et al. | 362/80 |
| 4,146,762 | 3/1979 | Peck et al. | 362/61 |
| 4,160,887 | 7/1979 | van Buren | 362/80 |
| 4,168,411 | 9/1979 | Peck | 362/80 |

*Primary Examiner*—Benjamin R. Padgett
*Assistant Examiner*—Irwin Gluck
*Attorney, Agent, or Firm*—Barnes, Kisselle, Raisch & Choate

[57] ABSTRACT

A trunk lid lamp assembly comprising a housing having a first generally tubular part having open ends and a second generally tubular part having a closed end wall with interengaging means which provide a snap fit between said parts. The first part has an axially extending slot into which an offset portion of a bracket extends. The bracket has an L-shaped bayonet slot therein which is exposed to the interior of the first part whereby it may receive the lug of a lamp bulb and hold the bulb in position in the first part. The second part has a portion engaging the bracket to hold the bracket in position in the slot of the first part. The second part also has an axially extending opening in the end wall thereof adjacent the periphery thereof and a terminal extends into the opening and is frictionally held in position. The terminal has a first contact portion. A contact is positioned in the second part and has a first portion extending axially into the first part for engaging with the base of a lamp bulb and a second portion for providing a contact with a mercury switch. A mercury switch engages the contact portion of said terminal and the second portion of the contact. The second housing part has integral portions thereof for holding the mercury switch in position.

12 Claims, 5 Drawing Figures

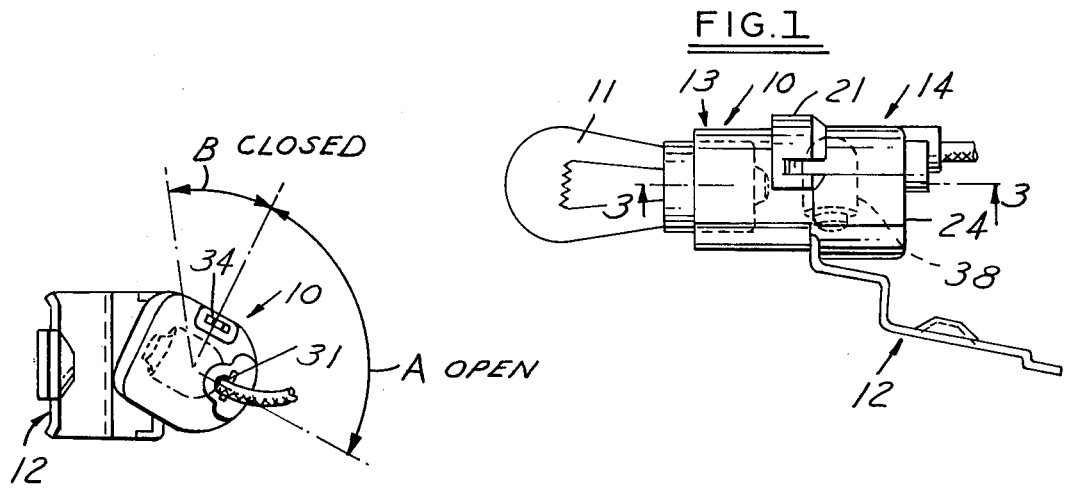
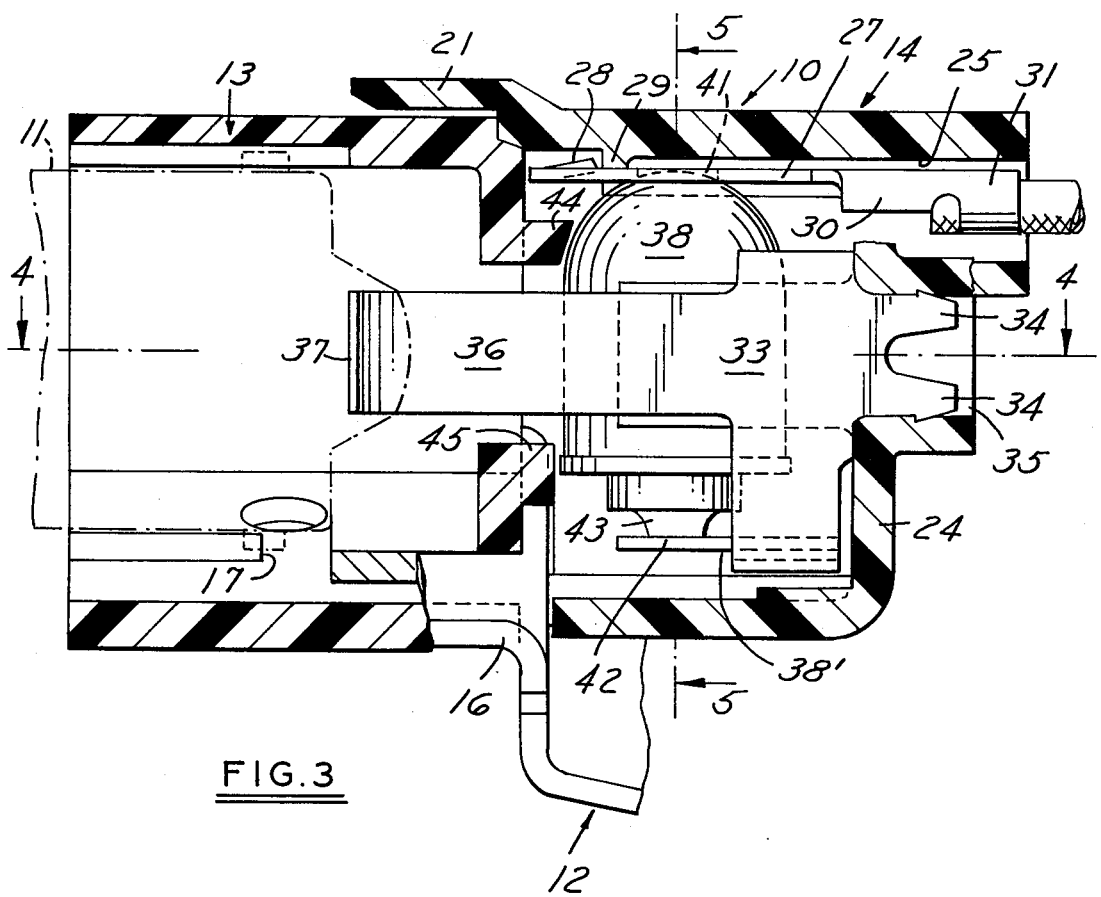

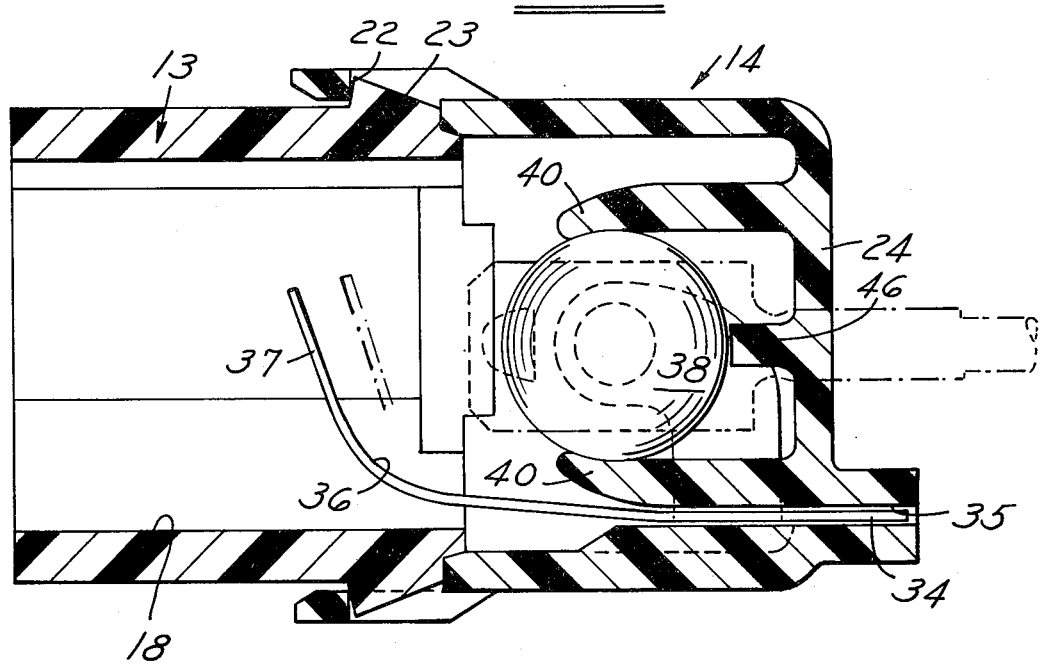
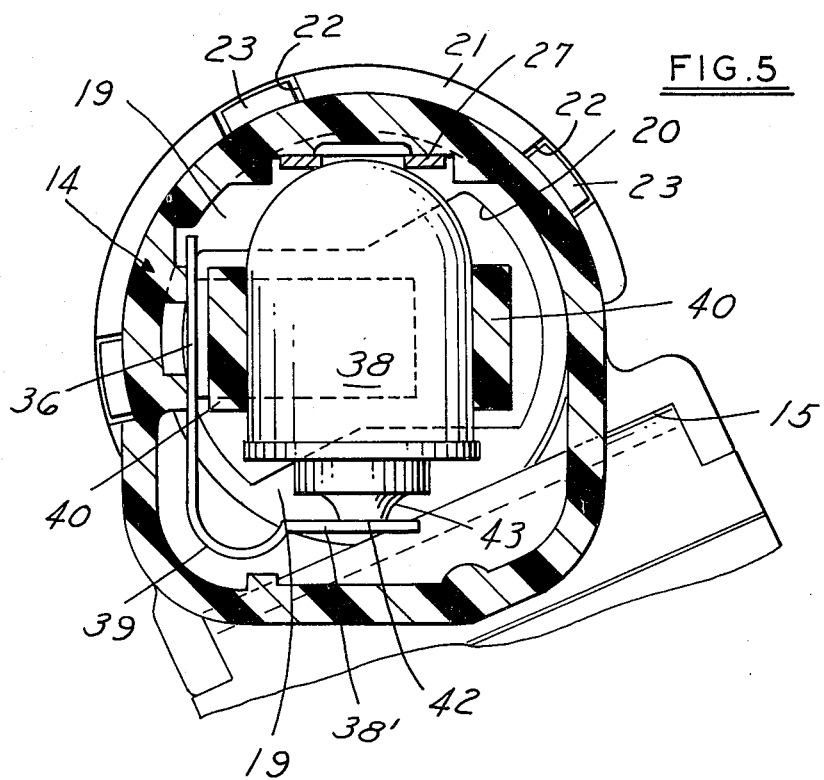

TRUNK LAMP ASSEMBLY

This invention relates to trunk lid lamps for use in illuminating the interior of the trunk of an automobile and the like.

BACKGROUND AND SUMMARY OF THE INVENTION

In connection with the trunk of automotive vehicles, it has become common to utilize a trunk lid lamp assembly mounted on the trunk lid which includes a switch for automatically illuminating the trunk when the trunk lid is elevated.

Among the objectives of the present invention are to provide a trunk lamp assembly which effectively performs its function, which can be more readily assembled and provides a positive action in use.

In accordance with the invention, the trunk lamp assembly comprises a housing having two parts, one of which receives the lamp bulb and the other of which supports the contacts and supports the switch that performs the function of turning the lamp on or off depending on the position of the trunk lid. The two parts of the housing interengage to maintain the bracket for supporting the housing and the mercury switch and the associated contacts in proper position on the trunk lid.

DESCRIPTION OF THE DRAWINGS

FIG. 1 is an elevational view of a trunk lamp assembly embodying the invention.

FIG. 2 is an end view of the same taken from the right in FIG. 1.

FIG. 3 is a sectional view taken along the line 3—3 in FIG. 1.

FIG. 4 is a sectional view taken along the line 4—4 in FIG. 3.

FIG. 5 is a sectional view taken along the line 5—5 in FIG. 3.

DESCRIPTION

Referring to FIGS. 1 and 2, the trunk lamp assembly includes a housing 10 that supports a lamp bulb 11 and a bracket 12 adapted to be mounted on the interior of a trunk lid. As shown in FIG. 2, when the trunk lamp assembly is mounted on a trunk lid the axis of the bulb 11 extends generally parallel to the pivotal axis of the trunk lid and the trunk lamp assembly functions to maintain the contacts to the lamp bulb 11 open during the movement through arc A of the trunk lid and closed as the trunk lid is in its upper position B.

Referring to FIGS. 3, 4 and 5, the housing 10 comprises a first housing part 13 and a second housing part 14 which are generally tubular. The first housing part 13 includes an axially extending slot 15 that receives the end portion 16 of mounting bracket 12 which end portion 16 is flat and has an L-shaped bayonet slot 17 for receiving the radially extending lug on the lamp bulb 11. The interior wall of the part 13 is generally cylindrical as at 18 and has a portion cut away to expose the flat end portion 16 of bracket 12.

The first part 13 also includes radially extending portions 19 that define a generally elongated opening 20 for purposes presently described.

The second part 14 of the housing includes a peripheral portion 21 telescoped over the inner end of first part 13 and having recesses 22 in the form of openings for receiving teeth 23 on the inner end of part 13 to thereby provide a snap connection between the two parts. When the parts 13, 14 are thereby assembled, the inner end of the second part 14 of the housing functions to retain the bracket 12 in position by engagement with the inner end of the portion 16 of the bracket (FIG. 3).

As shown in FIG. 3, the second part 14 includes a closed end wall 24 having an opening 25 therein adjacent to periphery thereof. An electrically conductive terminal 26 extends axially into the opening and has a contact portion 27 that extends axially inwardly along the inner surface of the housing part 14. The contact portion 27 includes a tang 28 that snaps behind a radially extending portion 29 in housing part 14 to prevent axially outward movement of the terminal 26. The terminal 26 further includes portions 30, 31 that are clamped about the base wire and sheath of the electrical lead.

An electrically conductive contact 33 is provided in the second part 14 and includes an axially extending portion in the form of barbed fingers 34 that are frictionally received in an axially extending slot 35 in the wall 24. The contact 33 further includes an axially extending portion 36 with a radially bent end 37 for engaging the contact of the lamp bulb 11. Contact 33 includes a second contact portion 38' that extends at a right angle from contact 36 and is connected thereto by a connecting portion 39.

A mercury switch of conventional construction comprising a capsule 38 is mounted between the contact portions 27 and contact portion 38' and is frictionally held in position by integral fingers 40 extending axially inward from wall 24 of housing part 14. The contact portion 27 includes an opening 41 for receiving the spherical end of the mercury switch 38 and the contact portion 38' includes a radially extending flat surface 42 for contacting the contact end 43 of the mercury capsule 38.

Axially extending projections 44, 45 that extend from the radially inwardly extending projections 19, 20 of housing part 14 together with an axially extending portion 46 on housing part 14 prevent the mercury switch 38 from moving out of proper position in the lamp assembly.

The parts 13, 14 of the housing are preferably made of plastic. Satisfactory results have been achieved by utilizing a type 6/6 heat stabilized nylon such as Dupont Zytel 103. Contact 33 should be made of electrically conductive spring tempered material such as spring tempered phosphor-bronze alloy or cadmium plated steel.

It can thus be seen that there has been provided a trunk lamp assembly that can be readily assembled and when assembled the parts thereof are held in proper position for use.

As shown in FIG. 5, the axis of the mercury switch 38 is transverse to the axis of the lamp bulb and the plane of the bracket portion 16 so that it is thereby transverse to the hinge axis of the trunk lid when the lamp assembly is in position. In addition, the axis of the mercury switch 38 forms an acute angle with the plane of the portion 16 of the bracket.

We claim:

1. A trunk lamp assembly comprising
    a housing having a first generally tubular part having open ends,
    said first part having an axially extending slot,
    a bracket having an offset portion extending into said slot, said bracket having means exposed to the interior of said first part whereby it may receive an electric bulb and hold the bulb in position in the first part with its axis along the axis of said first part, a second part, said second part being generally tubular and having a closed end wall, said first and second part having interengaging means for holding said parts in assembled relation, said second part having a portion engaging said bracket to hold said bracket in position in said slot of said first part, said second part having an opening in a wall thereof, a terminal extending through said opening, said terminal having a contact portion, a contact positioned in said second part, said contact having a first portion extending axially into said first part for engaging with the base of a lamp bulb, said contact having a second contact portion for providing a contact with a capsule type mercury switch, and a capsule type mercury switch engaging said contact portion of said terminal and said second contact portion of said contact, said mercury switch having its axis extending transversely to the axis of said first and second parts of said housing and said bulb.

2. The trunk lamp assembly set forth in claim 1 wherein the axis of said mercury switch forms and angle with the plane of said slot in said first part of said housing.

3. The trunk lamp assembly set forth in claim 1 wherein said first part includes inwardly extending portions for retaining said mercury switch.

4. The trunk lamp assembly set forth in claim 3 wherein said second part includes integral axially extending portions for frictionally engaging the periphery of said mercury switch.

5. The trunk lamp assembly set forth in claim 1 wherein said interengaging means between said first part and said second part comprises circumferentially spaced teeth on the periphery of the end of said first part nearest said second part, said second part having a peripheral portion telescoped over said end of said first part, said peripheral portion having recesses therein for receiving said teeth on said first part.

6. A trunk lamp assembly comprising a housing having a first generally tubular part having open ends, said first part having an axially extending slot, a bracket having an offset portion extending into said slot, said bracket having an L-shaped bayonet slot therein, said L-shaped slot of said bracket being exposed to the interior of said first part whereby it may receive an electric bulb and hold the bulb in position in the first part with its axis along the axis of said first part, a second part, said second part being generally tubular and having a closed end wall, said first and second part having interengaging means which provide a snap fit between said parts, said second part having a portion engaging said bracket to hold said bracket in position in said slot of said first part, said second part having an axially extending opening in the wall thereof adjacent the periphery thereof, a terminal extending into said opening and frictionally held into position, said terminal having a contact portion, interengaging means between the end of said contact portion of said terminal and said second part to hold said terminal against axially outward movement relative to said second part, said terminal having clamping portions for engaging a lead wire, a contact positioned in said second part, said contact having a first portion extending axially into said first part and having a radially inwardly bent portion for engaging with the base of a lamp bulb, said contact having a second contact portion at an angle to said first portion for providing a contact with a mercury switch, said second housing part having integral portions thereof for holding a capsule type mercury switch in position, and a capsule type mercury switch engaging said contact portion of said terminal and said second contact portion of said contact, said mercury switch having its axis extending transversely to the axis of said first and second parts of said housing and said bulb.

7. The trunk lamp assembly set forth in claim 6 wherein the axis of said mercury switch forms an angle with the plane of said slot in said first part on said housing.

8. The trunk lamp assembly set forth in claim 7 wherein said first part includes radially inwardly extending portions for retaining said mercury switch.

9. The trunk lamp assembly set forth in claim 8 wherein said second part includes integral axially extending portions for frictionally engaging the periphery of said mercury switch.

10. The trunk lamp assembly set forth in claim 9 wherein said interengaging means between said first part and said second part comprises circumferentially spaced teeth on the periphery of the end of said first part nearest said second part, said second part having a peripheral portion telescoped over said end of said first part, said peripheral portion having recesses therein for receiving said teeth on said first part.

11. The trunk lamp assembly set forth in claim 1 wherein said first and second parts are made of plastic material.

12. The trunk lamp assembly set forth in claim 6 wherein said first and second parts are made of plastic material.

* * * * *